(12) United States Patent  
Burgbacher et al.

(10) Patent No.: US 8,721,493 B2  
(45) Date of Patent: May 13, 2014

(54) DRIVE TRAIN FOR A MOTOR VEHICLE

(75) Inventors: Martin Burgbacher, Troy, MI (US); Bahman Haghshanas, Rochester, MI (US); Bernd Greiss, Sterling Heights, MI (US); Austin R. Gerding, Royal Oak, MI (US)

(73) Assignee: GKN Driveline Newton, LLC, Auburn Hills, MI (US)

( * ) Notice: Subject to any disclaimer, the term of this patent is extended or adjusted under 35 U.S.C. 154(b) by 193 days.

(21) Appl. No.: 13/081,205

(22) Filed: Apr. 6, 2011

(65) Prior Publication Data

US 2011/0256976 A1    Oct. 20, 2011

Related U.S. Application Data

(60) Provisional application No. 61/321,758, filed on Apr. 7, 2010.

(51) Int. Cl.  
*F16H 3/44* (2006.01)

(52) U.S. Cl.  
USPC ............................ 475/298; 475/223; 475/343

(58) Field of Classification Search  
USPC ......... 475/221–223, 225, 230, 237, 295, 298, 475/302, 303, 343  
See application file for complete search history.

(56) References Cited

U.S. PATENT DOCUMENTS

| | | | | |
|---|---|---|---|---|
| 4,476,953 A | * | 10/1984 | Hiraiwa | 180/249 |
| 4,541,503 A | * | 9/1985 | Akutagawa et al. | 180/249 |
| 4,669,332 A | * | 6/1987 | Katayama | 475/206 |
| 2010/0041506 A1 | * | 2/2010 | Cooper et al. | 475/223 |
| 2010/0094519 A1 | * | 4/2010 | Quehenberger et al. | 701/69 |

* cited by examiner

*Primary Examiner* — Justin Holmes  
(74) *Attorney, Agent, or Firm* — Jennifer M. Brumbaugh; Reising Ethington P.C.

(57) ABSTRACT

A drive train system comprising a power transfer unit configured to selectively transfer power from a front driveshaft of a vehicle by providing an output torque through a ring gear, wherein the power transfer unit includes an input shaft that receives torque from a first device, and a first clutch configured to selectively couple the input shaft to the ring gear when activated; a cardan shaft in rotational communication with the ring gear and configured to transfer the output torque; and a rear drive unit coupled to the cardan shaft and configured to selectively transfer the output torque received from the cardan shaft to a rear driveshaft of the vehicle, wherein the rear drive unit includes a torque shaft that is driven by the output torque received from the cardan shaft, and a second clutch that is configured to selectively transfer the output torque from the torque shaft to the rear driveshaft when activated.

27 Claims, 6 Drawing Sheets

DRIVE TRAIN FOR A MOTOR VEHICLE

CROSS-REFERENCE TO RELATED PATENT APPLICATIONS

This application claims priority to and the benefit of U.S. Provisional Application No. 61/321,758, filed Apr. 7, 2010, the entire disclosure of which is incorporated by reference herein.

BACKGROUND

The present application relates generally to the field of drive trains for motor vehicles. More specifically, the present application relates to a drive train system which constantly provides driving torque to the front wheels and may selectively provide driving torque to the rear wheels.

In some motor vehicles (more commonly in trucks and SUVs), it has been known to have a drive train which provides switchable four-wheel drive. These systems typically have the rear wheels continuously driven by torque from the cardan shaft, which is driven by the transmission. These systems tend to have user-switchable four-wheel drive, such that the user through a lever (e.g., shifter, switch) engages a transfer case that redistributes a portion of the torque from the rear wheels to the front wheels. These systems are primarily designed to operate during low traction conditions, such as slippery conditions created by snow or off-road type conditions.

In other motor vehicles (more commonly in passenger cars, such as sedans), it has been known to have a drive train that provides all wheel drive (AWD). These systems typically have one set of wheels (typically the front wheels) driven by torque from the transmission and, as required, torque is redistributed to the other set of wheels (typically the rear wheels), by actuation of a clutch system. This redistribution of torque may be automatically transferred by the vehicle when it determines that the front wheels (or front differential) have angular velocities that differ by a predetermined amount from the angular velocities of the rear wheels (or rear differential), which indicates slippage of the front wheels created by torque exceeding traction. When the vehicle determines this difference in angular velocities between wheels, it engages the clutch mechanism, which couples a driveshaft to the operating power train system that redistributes some of the torque generated through the power train to the rear wheels. This system reduces the torque driven to the slipping wheels to a point to achieve traction again, and redistributes the reduced torque to the non-slipping wheels.

It would be advantageous to have a drive train system that provides driver selectable AWD capability by redistributing torque more efficiently (i.e., less power loss). It would also be advantageous to have an AWD drive train system that may be produced at a lower cost and with greater reliability than conventional AWD systems.

SUMMARY

An exemplary embodiment relates to a drive train system comprising a power transfer unit configured to selectively transfer power from a front driveshaft of a vehicle by providing an output torque through a ring gear, wherein the power transfer unit includes an input shaft that receives torque from a first device, and a first clutch configured to selectively couple the input shaft to the ring gear when activated; a cardan shaft in rotational communication with the ring gear and configured to transfer the output torque; and a rear drive unit coupled to the cardan shaft and configured to selectively transfer the output torque received from the cardan shaft to a rear driveshaft of the vehicle, wherein the rear drive unit includes a torque shaft that is driven by the output torque received from the cardan shaft, and a second clutch that is configured to selectively transfer the output torque from the torque shaft to the rear driveshaft when activated.

Another exemplary embodiment relates to a power transfer unit for selectively transferring torque and configured for use in a drive train system of a motor vehicle. The power transfer unit includes an input shaft that is configured to rotate about a rotational axis and receives an input torque from a first drive train device; a clutch having a hub connected to the input shaft and an engaging gear slideably coupled to the hub, wherein the hub rotates about the rotational axis with the input shaft; a ring gear configured to selectively rotate about the rotational axis to provide an output torque; and a housing configured to enclose at least a portion of the power transfer unit. When the clutch is activated, the engaging gear slides into engagement with the ring gear to transfer the input torque from the input shaft to the ring gear through the clutch. When the clutch is deactivated, the engaging gear slides out of engagement with the ring gear, such that no torque is transferred to the ring gear through the clutch.

Another exemplary embodiment relates to a rear drive unit for use in a drive train system of a motor vehicle and configured to selectively transfer a received input torque to first and second wheels of the vehicle. The rear drive unit includes a first torque shaft configured to receive the input torque and configured to rotate about an axis of rotation, a second torque shaft configured to receive the input torque and configured to rotate about the axis of rotation, a first clutch configured to selectively transfer the input torque from the first torque shaft to the first wheel of the vehicle when activated, and a second clutch configured to selectively transfer the input torque from the second clutch to the second wheel of the vehicle when activated. When the first clutch is deactivated no torque is transferred from the first torque shaft to the first wheel, and when the second clutch is deactivated no torque is transferred from the second torque shaft to the second wheel.

DETAILED DESCRIPTION

According to a disclosed embodiment, a drive train for a motor vehicle for selectively transferring torque in a motor vehicle having a constantly driven front driveshaft and a rear driveshaft, which is selectively provided torque, is provided. The drive train system includes a power transfer unit, a cardan shaft, a rear drive unit, and a housing configured to enclose at least a portion of the drive train system. The power transfer unit is provided in the forward region of the vehicle near the front driveshaft and is configured to selectively provide an output torque through a ring gear. The power transfer unit also includes an input shaft that is transversely configured to rotate about a rotational axis and receives torque from a first device or first drive train device, such as a transmission or differential, and a first clutch configured to selectively couple the input shaft to the ring gear when activated. The cardan shaft is configured to transfer the torque received from the power transfer unit to the rear drive unit. The rear drive unit is provided in the rearward region of the vehicle near the rear driveshaft and is configured to selectively transfer the torque received from the cardan shaft to the rear driveshaft. The rear drive unit includes a torque shaft that is transversely configured to rotate about an axis of rotation and is driven by the torque received from the cardan shaft, and a second clutch that is configured to selectively transfer the torque from the torque shaft to the rear driveshaft when activated.

The first clutch of the power transfer unit may include an engaging gear that is configured to slide between a first position, to thereby couple the input shaft and ring gear, and a second position, to thereby decouple the ring gear from the input shaft. The drive train system may further include an actuator for activating the first clutch, whereby the actuator may be configured to move the engaging gear between the first and second positions. The actuator may be an electric motor, a piston that is controlled by fluid pressure, or any suitable device. The drive train system may also include a shift fork that is provided between the actuator and the engaging gear, whereby movement of the actuator moves the shift fork, which in turn moves the engaging gear. The power transfer unit may further include an output shaft configured to transfer the output torque from the ring gear to the cardan shaft.

The rear drive unit may further include a second torque shaft, whereby the first torque shaft provides torque to a first rear driveshaft and the second torque shaft provides torque to a second rear driveshaft. The rear drive unit may further include a third clutch that is configured to selectively transfer the torque from the second torque shaft to the second rear driveshaft when activated. The rear drive unit may also include a differential assembly configured to receive the torque from the cardan shaft, and configured to rotate the first and second torque shafts at similar or different speeds, depending on the vehicle condition. The rear drive unit may also include an input shaft configured to transfer torque received from the cardan shaft to the differential assembly. The second clutch may include an engaging gear configured to slide between a first position, to thereby couple the torque shaft and rear driveshaft, and a second position, to thereby decouple the rear driveshaft from the torque shaft. The first device that provides input torque to the power transfer unit may be a differential assembly configured to receive torque from a transmission of the vehicle.

According to another disclosed embodiment, a power transfer unit configured for use in a drive train system of a motor vehicle for selectively transferring torque is provided. The power transfer unit includes an input shaft that is configured to rotate about a rotational axis and which receives an input torque from a first drive train device. The power transfer unit also includes a clutch having a hub connected to the input shaft (such that the hub rotates about the rotational axis with the input shaft), an engaging gear slideably coupled to the hub, a ring gear configured to selectively rotate about the rotational axis to provide an output torque, and a housing configured to enclose at least a portion of the input shaft, clutch and/or ring gear. When the clutch is activated the engaging gear slides into engagement with the ring gear, thereby transferring torque from the input shaft to the ring gear through the clutch. When the clutch is deactivated the engaging gear slides out of engagement with the ring gear, whereby no torque is transferred to the ring gear. The engaging gear may be configured to slide in a direction substantially parallel to the rotational axis to engage and disengage the ring gear.

The power transfer unit may also include an actuator configured to activate and deactivate the clutch by moving the engaging gear into and out of engagement with the ring gear. The actuator may be an electric motor, a piston that is controlled by fluid pressure, or any suitable device. The power transfer unit may also include a shift fork having a first end connected to the engaging gear and a second end connected to the actuator, whereby movement of the actuator moves the shift fork thereby moving the engaging gear. The power transfer unit may also include an output shaft configured substantially transverse to the rotational axis and configured to provide an output torque, wherein the output shaft is configured to receive the torque from the ring gear. The first drive train device that provides the power transfer unit with an input torque may be a differential assembly configured to receive torque from a transmission.

According to another disclosed embodiment, a rear drive unit configured for use in a drive train system of a motor vehicle to provide selective transferring of a received input torque to first and second wheels of the vehicle is provided. The rear drive unit includes a first torque shaft configured to receive a first torque and configured to rotate about an axis of rotation, a second torque shaft configured to receive a second torque and configured to rotate about the axis of rotation, a first clutch configured to selectively transfer the first torque from the first torque shaft to the first wheel of the vehicle when activated, a second clutch configured to selectively transfer the second torque from the second clutch to the second wheel of the vehicle when activated, and a housing that encloses at least a portion of the first and second torque shafts and/or at least a portion of the first and second clutches. When the first clutch is deactivated no torque is transferred from the first torque shaft to the first wheel, and when the second clutch is deactivated no torque is transferred from the second torque shaft to the second wheel.

The rear drive unit may also include a differential assembly that is configured to receive the input torque and is configured to output the first torque to the first torque shaft and output the second torque to the second torque shaft; wherein the differential assembly is configured to rotate the first and second torque shafts at similar or different speeds depending on the vehicle condition. The rear drive unit may also include an input shaft configured substantially transverse to the axis of rotation of the first and second torque shafts, and configured to receive the input torque of the rear drive unit, wherein the input shaft includes a gear for transferring the input torque to the differential assembly. The rear drive unit may include a first engaging gear configured to slide between a first position to thereby couple the first torque shaft and first wheel, and a second position to thereby decouple the first wheel from the first torque shaft. The rear drive unit may also include a second engaging gear configured to slide between a first position to thereby couple the second torque shaft and the second wheel, and a second position to thereby decouple the second wheel from the second torque shaft. The rear drive unit may be configured to receive the input torque from the cardan shaft of the vehicle.

Figure 1:
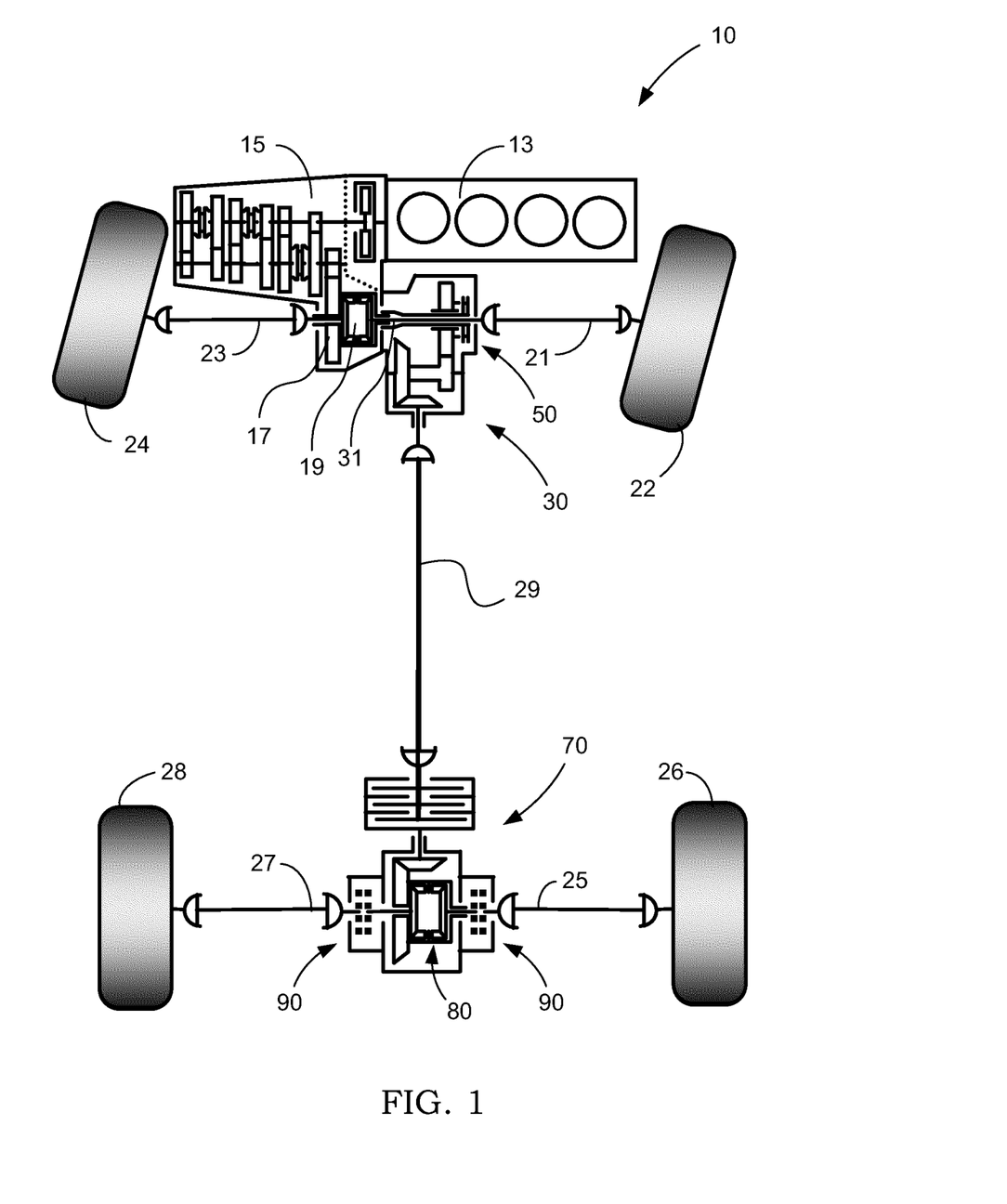
FIG. 1 is a top schematic view of a drive train system according to an exemplary embodiment.

FIG. 1 illustrates a power train or drive train system 10 according to an exemplary embodiment, which includes an engine 13, a transmission 15, a final drive 17, a front differential 19, a first (or front right) driveshaft 21, a second (or front left) driveshaft 23, a third (or rear right) driveshaft 25, a fourth (or rear left) driveshaft 27, a first (or front right) wheel 22, a second (or front left) wheel 24, a third (or rear right) wheel 26, a fourth (or rear left) wheel 28, a cardan shaft 29, a power transfer unit 30, and a rear drive unit 70. The engine 13 may be mounted transversely and is configured to provide output power to the transmission 15, which is configured to provide power as required to the final drive 17. The final drive 17 is configured to provide power into the front differential 19, where the final drive 17 may include at least one beveled gear, hypoid gear, or helical gear that may be configured to transfer torque into a mating and meshed gear of the front differential 19. The first and second driveshafts 21, 23 are rotationally coupled to the front differential 19, thereby allowing driving torque to be transferred from the engine 13 through transmission 15, through final drive 17, and into front differential 19, thus driving the first and second driveshafts 21, 23. The front differential 19 includes a gear train that allows the first and second driveshafts 21, 23 to rotate at different angular velocities to accommodate vehicle turning or loss of traction by one driveshaft. The power transfer unit 30 includes an input shaft 31, which may be coupled to a first device (or a first drive train device) such as the front differential 19 (or transmission), and a first clutch mechanism 50, which may selectively (or disengageably) couple the input shaft 31 to the cardan shaft 29 through a gear assembly. The power transfer unit 30 and gear assembly are discussed in greater detail below. The electronic control unit (ECU) or electronic control module (ECM) of the vehicle actuates engagement of the first clutch mechanism 50, coupling the cardan shaft 29 to the input shaft 31 through the power transfer unit 30. The cardan shaft 29 is coupled to the rear drive unit 70, which includes a differential assembly 80, thus torque transferred through the cardan shaft 29 is transferred into the differential assembly 80. Subsequent to actuation of the first clutch mechanism 50 and preferably after the drive train system 10 has been brought up to speed, the ECU of the vehicle also actuates a vacuum system that causes two second clutch mechanisms 90 included within the rear drive unit 70 to engage substantially simultaneously, which transfers the torque from the differential assembly 80 to both the third and fourth driveshafts 25, 27. The rear drive unit 70 is discussed in greater detail below.

Figure 2:
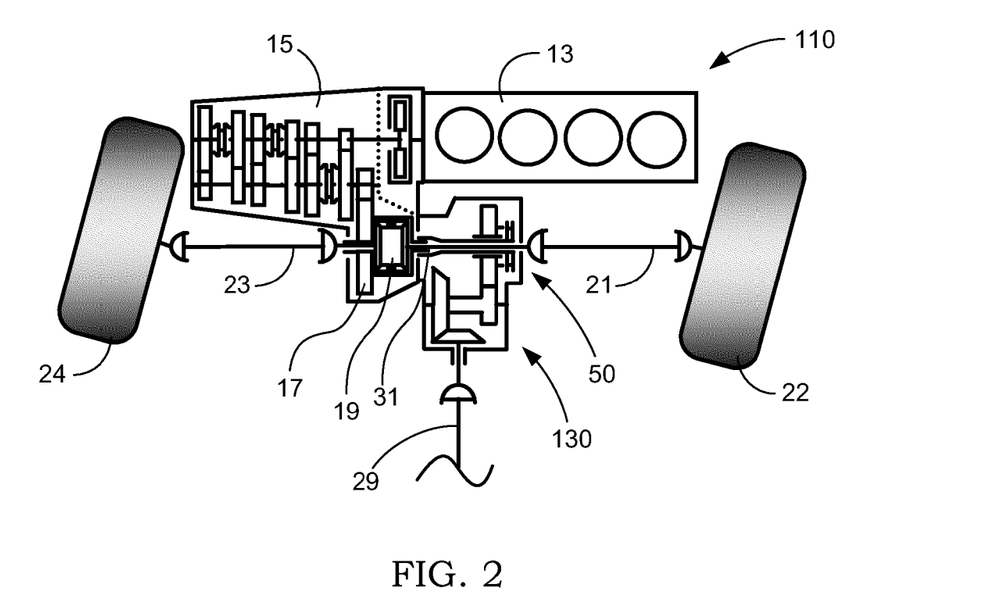
FIG. 2 is a top schematic view of a portion of the drive train system according to another exemplary embodiment.

FIG. 2 illustrates a power train or drive train system 110, according to another exemplary embodiment, which includes an engine 13, a transmission 15, a final drive 17, a front differential 19, a first driveshaft 21, a second driveshaft 23, a first wheel 22, a second wheel 24, a cardan shaft 29, and a power transfer unit 130. The engine 13 may be mounted transversely and is configured to provide output power to the transmission 15, which is configured to provide power as required to the final drive 17. The final drive 17 is configured to provide power into the front differential 19, where the final drive 17 may include at least one beveled gear, hypoid gear, or helical gear that may be configured to transfer torque into a mating and meshed gear of the front differential 19. The first and second driveshafts 21, 23 are rotationally coupled to the front differential 19, thereby allowing driving torque to be transferred from the engine 13 through transmission 15, through final drive 17, and into front differential 19, thus driving the first and second driveshafts 21, 23. The front differential 19 includes a gear train that allows the first and second driveshafts 21, 23 to rotate at different angular velocities to accommodate vehicle turning or loss of traction by one driveshaft. The power transfer unit 130 includes an input shaft 31, which may be coupled to a first device (or a first drive train device) such as the front differential 19 (or transmission), and a first clutch mechanism 50, which may selectively couple the input shaft 31 to the cardan shaft 29 through a gear assembly. The power transfer unit 130 and gear assembly are discussed in greater detail below. The ECU or ECM of the vehicle actuates engagement of the first clutch mechanism 50, coupling the cardan shaft 29 to the input shaft 31 through the power transfer unit 130. The cardan shaft 29 may couple to a device, such as a rear drive unit or a rear differential, to supply torque and power to the rear wheels of the vehicle.

Figure 3:
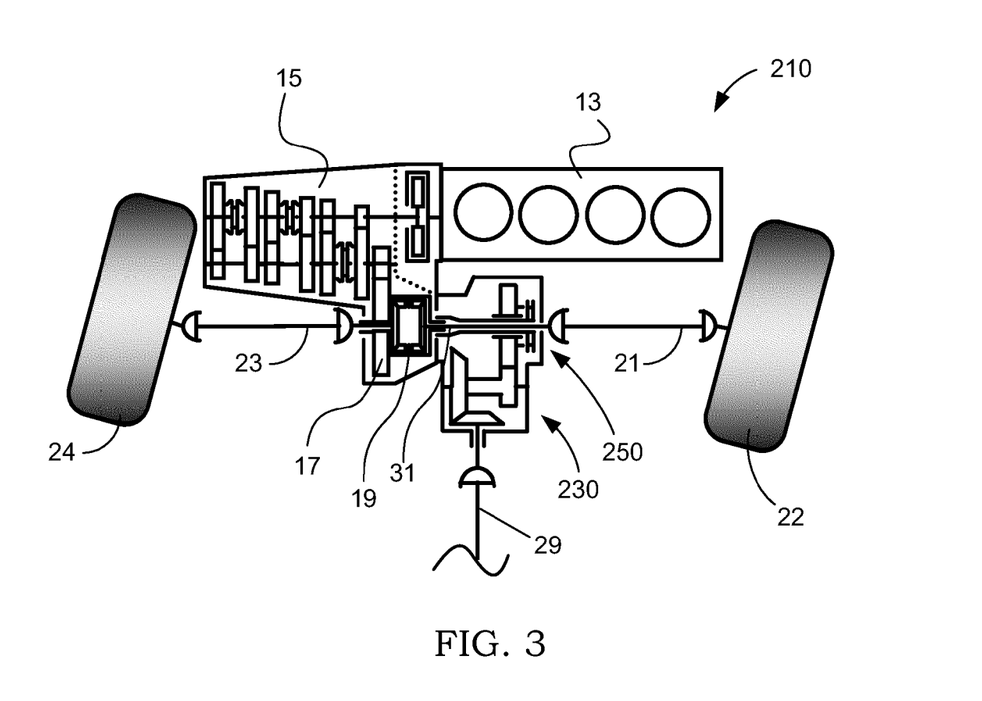
FIG. 3 is a top schematic view of a portion of the drive train system according to yet another exemplary embodiment.

FIG. 3 illustrates a power train or drive train system 210, according to another exemplary embodiment, which includes an engine 13, a transmission 15, an final drive 17, a front differential 19, a first driveshaft 21, a second driveshaft 23, a first wheel 22, a second wheel 24, a cardan shaft 29, and a power transfer unit 230. The engine 13 may be mounted transversely and is configured to provide output power to the transmission 15, which is configured to provide power as required to the final drive 17. The final drive 17 is configured to provide power into the front differential 19, where the final drive 17 may include at least one beveled gear, hypoid gear, or helical gear that may be configured to transfer torque into a mating and meshed gear of the front differential 19. The first and second driveshafts 21, 23 are rotationally coupled to the front differential 19, thereby allowing driving torque to be transferred from the engine 13 through transmission 15, through final drive 17, and into front differential 19, thus driving the first and second driveshafts 21, 23. The front differential 19 includes a gear train that allows the first and second driveshafts 21, 23 to rotate at different angular velocities to accommodate vehicle turning or loss of traction by one driveshaft. The power transfer unit 230 includes an input shaft 31, which may be coupled to a first device (or a first drive train device) such as the front differential 19 (or transmission), and a first clutch mechanism 250, which may selectively couple the input shaft 31 to the cardan shaft 29 through a gear assembly. The power transfer unit 30 and gear assembly are discussed in greater detail below. The ECU or ECM of the vehicle actuates engagement of the first clutch mechanism 250, coupling the cardan shaft 29 to the input shaft 31 through the power transfer unit 230. The cardan shaft 29 may couple to a device, such as a rear drive unit or a rear differential, to supply torque and power to the rear wheels of the vehicle.

Figure 4:
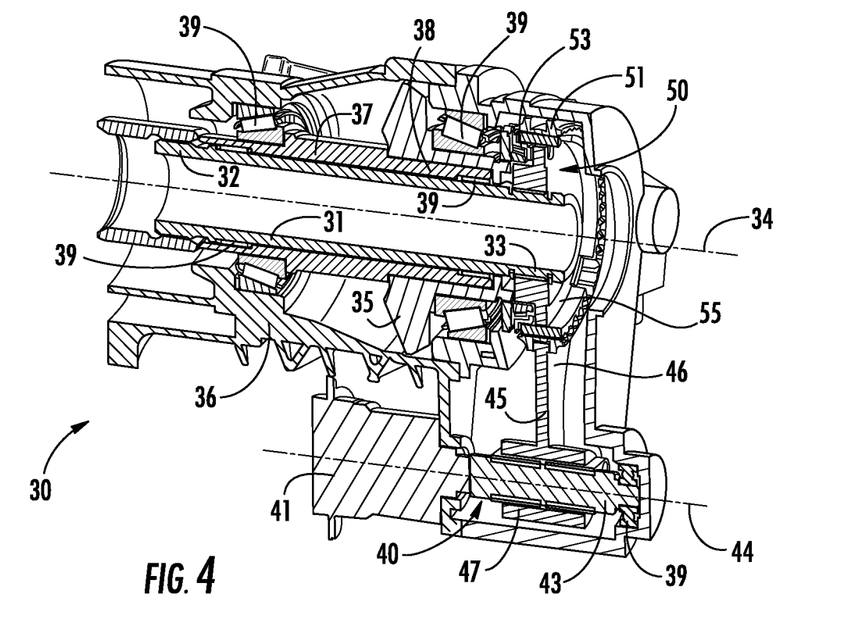
FIG. 4 is a partially sectioned perspective view of an exemplary embodiment of a power transfer unit for use within a drive train system, such as the drive train system of FIG. 1.

FIG. 4 illustrates a power transfer unit 30, according to an exemplary embodiment, that is configured for use within a power train system, such as the power train system 10 of FIG. 1. Power transfer unit 30 includes an input shaft 31, a housing 36, a ring gear 35, a sleeve 37, a plurality of bearings 39, an actuator assembly 40, a first clutch mechanism 50, and an output assembly 60 (shown in FIG. 5). According to an exemplary embodiment, the input shaft 31 is the first drive shaft 21.

According to other embodiments, the input shaft 31 is a separate hollow tube member coupled to a driveshaft, such as the first drive shaft 21, and may be made from steel or some other material strong enough to transmit the required torque. The input shaft 31 includes a first end 32, a second end 33, and a rotational axis 34, which is configured to extend in a direction transverse to the longitudinal (or travelling) direction of the vehicle. The first end 32 may be coupled to the front differential 19, so that torque transmitted through the front differential 19 may drive the input shaft 31 in the corresponding rotational direction having the substantially same torque and frequency. The second end 33 may be coupled to the first clutch mechanism 50.

The first clutch mechanism 50 includes an engaging gear 51, a synchronizer 53, and a hub 55. The inner surface of the hub 55 of the first clutch mechanism 50 is fixedly connected to the outside surface of the second end 33 of the input shaft 31, so that the input shaft 31 and the hub 55 rotate about the rotational axis 34, having substantially the same torque and frequency. The engaging gear 51 is slidably coupled to the hub 55, so that the engaging gear 51 rotates about the rotational axis 34 with the same torque and frequency as the hub 55, yet the engaging gear 51 can slide in the direction along the rotational axis 34, relative to hub 55, when driven by the actuator assembly 40. The inner surface of the engaging gear 51 may include gear teeth for engaging the ring gear 35 to transfer torque from the input shaft 31 through first clutch mechanism 50 and into ring gear 35. When the actuator assembly 40 drives the engaging gear 51 in the direction of the ring gear 35, the synchronizer 53 couples the engaging gear 51 to the ring gear 35 through friction of the rings of the synchronizer 53 prior to engagement of the gear teeth of the engaging gear 51 and ring gear 35. Thus, the synchronizer 53 permits the engaging gear 51 to rotate with substantially the same torque and frequency as the ring gear 35 prior to engagement of teeth to prohibit impact between the teeth upon engagement, which results when the teeth of two gears rotating with different frequencies and torques engage each other. The synchronizer 53 provides improved durability of the power transfer unit 30 by reducing wear and damage on the first clutch mechanism 50 during engagement to the input shaft 31. According to an exemplary embodiment, synchronizer 53 includes a double cone having friction material (typically a carbon based material) on both sides, to improve the efficiency of the synchronizer 53 allowing for a reduced diameter to manage the loading. According to other embodiments, synchronizer 53 may include a single cone, triple cone, or other configuration to improve durability by reducing wear.

The actuator assembly 40 includes an actuator 41, a displacing member 43, and a shift fork 45. According to an exemplary embodiment, actuator 41 may include an electric motor having gear reduction, which may be actuated by the ECU of the vehicle or other vehicle component. When actuated the motor may be coupled to and drive the displacing member 43, which according to an exemplary embodiment may include a ball screw mechanism. This configuration includes the external surface of the displacing member 43 being threaded and is coupled through the treads to the inner surface of the second end 47 of the shift fork 45, having a mating threaded surface. The actuator 41 rotates the displacing member 43 about the displacing axis 44 and the shift fork 45, being prohibited from rotation by the housing 36 of the power transfer unit 30, is driven linearly by the thread coupling with the displacing member 43 along the displacing axis 44, which is substantially parallel to the rotational axis 34. The first end 46 of the shift fork 45 is coupled to the engaging gear 51, so that the engaging gear 51 may rotate independently of the shift fork 45 about rotational axis 34, but when shift fork 45 is driven linearly in a direction along the displacing axis 44, it drives engaging gear 51 in the same direction with substantially the same displacement. A portion of or all of the actuator assembly 40 may be contained within the housing 36 of the power transfer unit 30 and the housing 36 may include one or more bearings 39 to provide for efficient rotation of the components of the actuator assembly 40, such as the displacing member 43.

As shown in FIG. 4, the sleeve 37 is a hollow tube made of steel or other material strong enough to transfer the required torque and is held substantially concentric to the input shaft 31 by bearings 39. The bearings 39 allow sleeve 37 to rotate independent of input shaft 31 about the rotational axis 34, having the inner surface of the sleeve 37 proximate to the outer surface of input shaft 31. The sleeve 37 includes a coupling end 38, which is fixedly coupled to the inner surface of the ring gear 35, so that they both rotate with the substantially same torque and frequency. The coupled sleeve 37 and ring gear 35 are held in place by bearings 39 that prevent translation of the members along the rotational axis 34, but allow rotation about rotational axis 34. The bearings 39 are coupled on the other end to the housing 36, so the rotational axis 34, and the concentricity between the input shaft 31 and sleeve 37 are maintained by the housing 36.

Figure 5:
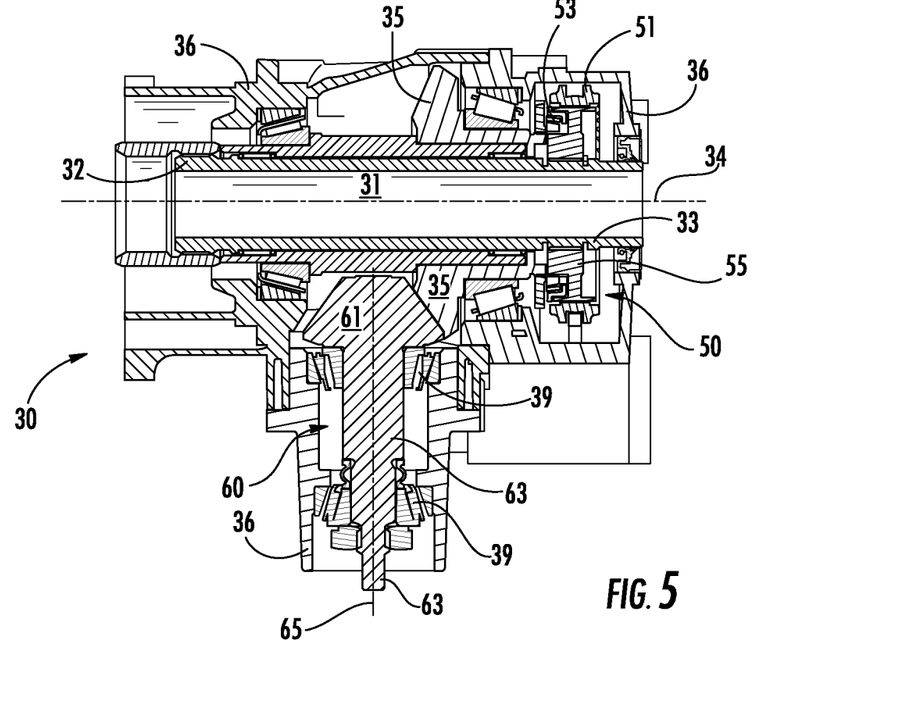
FIG. 5 is a partially sectioned top view of the power transfer unit of FIG. 4.

As shown in FIG. 5, the output assembly 60 of the power transfer unit 30 includes a pinion 61, a shaft 63, and at least one bearing 39 (a cardan axis 65 is represented by a dashed line that is aligned with the central longitudinal axis of the shaft 63). According to an exemplary embodiment, output assembly 60 is maintained within housing 36. According to another embodiment, output assembly 60 is maintained within a structure separate from the housing 36, that may be coupled to the housing 36. According to an exemplary embodiment, the pinion 61 is a beveled gear fixedly coupled on one end of the shaft 63, which is rotatably coupled through a gear mesh to the mating beveled gear teeth of the ring gear 35, so that when the ring gear 35 rotates about the rotational axis 34, it transfers torque and rotation to the pinion 61 causing it to rotate about the cardan axis 65. The cardan axis 65 runs perpendicular or transverse to the rotational axis 34, and runs substantially in the direction of the longitudinal axis of the vehicle. According to an exemplary embodiment, the pinion 61 and shaft 63 may be made from one member. According to other embodiments, the pinion 61 and shaft 63 may be made from more than one member coupled together to operate as one member.

Figure 6:
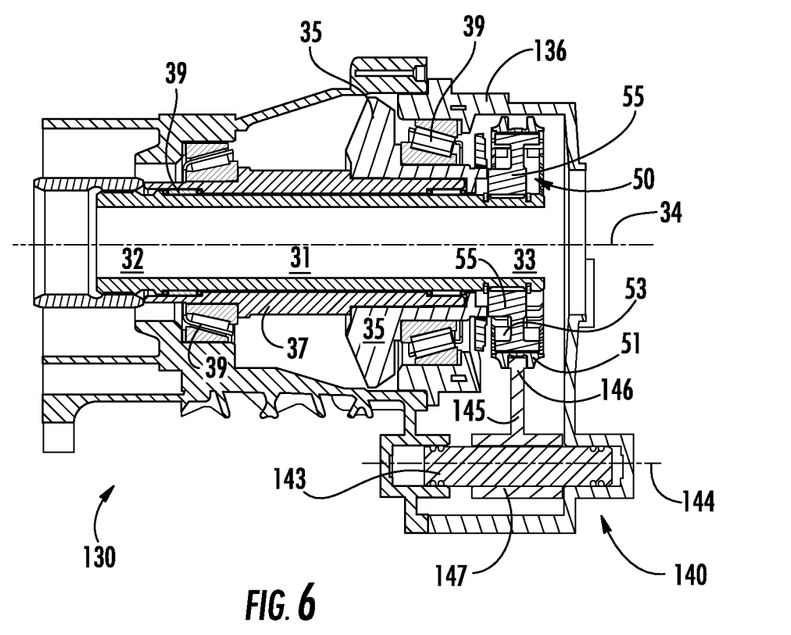
FIG. 6 is a partially sectioned rear view of another exemplary embodiment of a power transfer unit shown in the disengaged position, for use within a drive train system, such as the drive train system of FIG. 2.

FIG. 6 illustrates a power transfer unit 130, according to another exemplary embodiment, that is configured for use within a power train system, such as the power train system 110 shown in FIG. 2. Power transfer unit 130 includes an input shaft 31, a housing 136, a ring gear 35, a sleeve 37, a plurality of bearings 39, an actuator assembly 140, a first clutch mechanism 50, and an output assembly 60. The input shaft 31, the ring gear 35, the sleeve 37, the bearings 39, the first clutch mechanism 50, and the output assembly 60 may be configured as described above. The housing 136 may be configured substantially the same as described above, except that it may be configured to include a hollow chamber for containing the actuator assembly 140. FIG. 6 illustrates the first clutch mechanism 50 in a disengaged (or deactivated) position, such that torque is not transferred from the input shaft 31 to the ring gear 35, and only the input shaft 31 rotates with torque from the front differential 19. Under the disengaged configuration of the power transfer unit 130, the vehicle would operate with torque being applied only to the first and second driveshafts 21, 23.

The actuator assembly 140 includes a displacing member 143 and a shift fork 145. According to an exemplary embodiment, the displacing member 143 may be a piston that resides inside a hollow chamber within the housing 136. The displacing member 143 moves along the displacing axis 144, driven by changes in pressure of a fluid within the chamber. The fluid may be air controlled by a vacuum system, or may be a liquid driven by hydraulic pressure. The fluid may be controlled by a pump that is activated by the ECU of the vehicle or other vehicle component. When the displacing member 143 is displaced linearly along the displacing axis 144, it also displaces the shift fork 145 a substantially equal distance, since the second end 147 of the shift fork 145 may be coupled to the displacing member 143. The first end 146 of the shift fork 145 may be coupled to the engaging gear 51, so that the engaging gear 51 may rotate independently of the shift fork 145 about rotational axis 34, but when shift fork 145 is driven linearly in a direction along the displacing axis 144, it drives engaging gear 51 in the same direction with substantially the same displacement.

Figure 7:
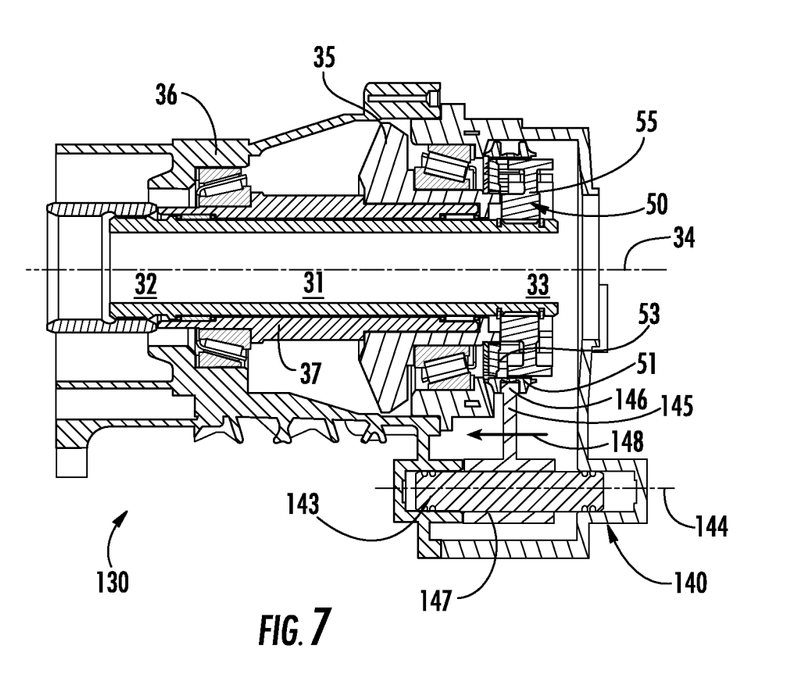
FIG. 7 is a partially sectioned rear view of the power transfer unit of FIG. 6 shown in the engaged position.

FIG. 7 illustrates the power transfer unit 130 with the first clutch mechanism 50 engaged (or activated), thereby transferring torque from the input shaft 31 to the ring gear 35 through the first clutch mechanism 50. When the displacing member 143 is driven linearly in the engaging direction 148, the coupled shift fork 145 displaces substantially the same distance, and in turn displaces the engaging gear 51 in the same direction and by the same displacement. Prior to the gear teeth of the inner surface of the engaging gear 51 coupling to the outer teeth of the ring gear 35, the synchronizer 53 of the first clutch mechanism 50 engages the engaging gear 51 and the ring gear 35 through friction cones to impart a substantially common rotational speed between the engaging gear 51 and the ring gear 35. The synchronizer 53 prevents impact damage between the teeth of the engaging gear 51 and the ring gear 35, that may occur if they are engaged having relative different rotational speeds. Once the engaging gear 51 and ring gear 35 are engaged, the torque from the front differential 19 is transferred through both the input shaft 31 and the engaging gear 51 to the output assembly 60 of the power transfer unit 130. Under the engaged configuration of the power transfer unit 130, the vehicle may operate with torque being applied to the first, second, third and fourth driveshafts 21, 23, 25, 27.

To transfer back to the disengaged configuration of the power transfer unit 130, the displacing member 143 is driven linearly in the direction opposite to the engaging direction 148, thereby displacing the shift fork 145 in the same direction with substantially the same displacement. This displacement of the shift fork 145 in turn drives the engaging gear 51 of the first clutch mechanism 50 away from the ring gear 35, thereby disengaging their teeth mesh. Once the teeth mesh between the engaging gear 51 and the ring gear 35 is uncoupled, torque from the front differential 19 is transferred only through the input shaft 31 to the first and second driveshafts 21, 23.

Figure 8:
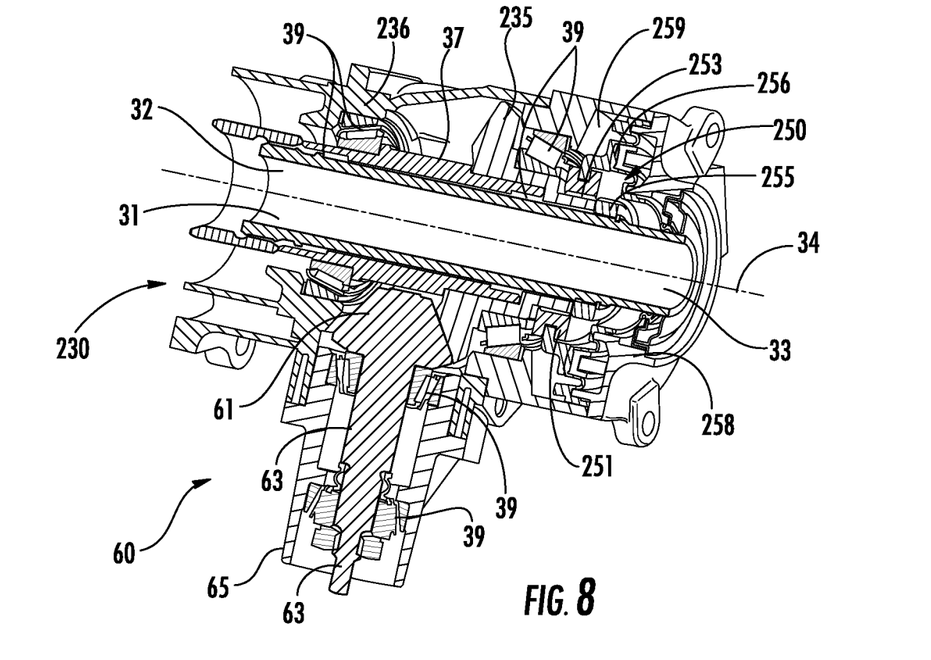
FIG. 8 is a partially sectioned perspective view of another exemplary embodiment of a power transfer unit shown in the disengaged position, for use within a drive train system, such as the drive train system of FIG. 3.
Figure 9:
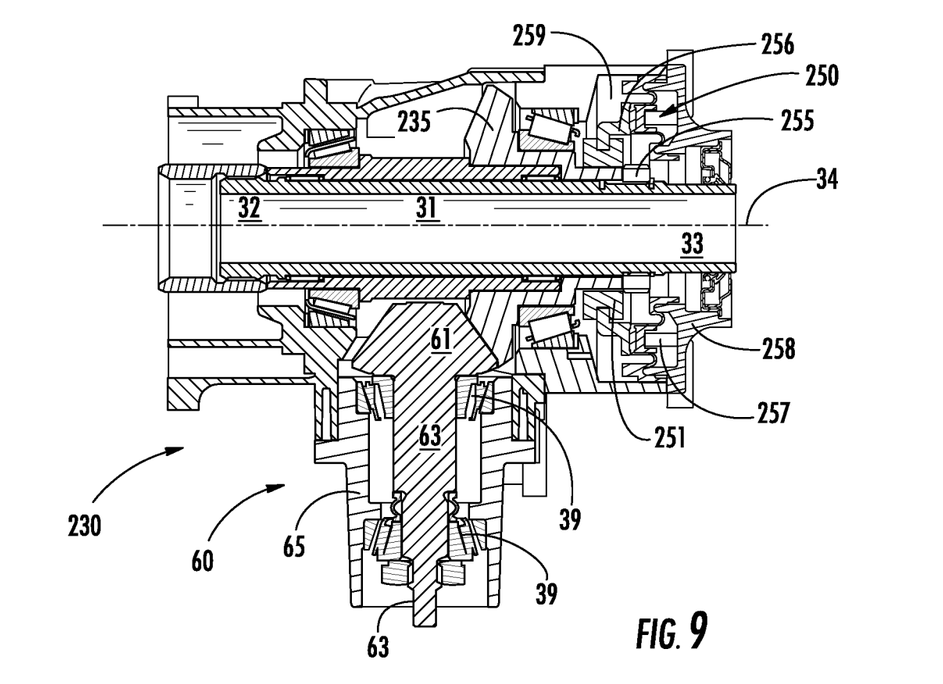
FIG. 9 is a partially sectioned top view of the power transfer unit of FIG. 8 shown in the disengaged position.

FIGS. 8 and 9 illustrate a power transfer unit 230, according to another exemplary embodiment, that is configured for use within a power train system, such as the power train system 210 of FIG. 3. Power transfer unit 230 includes an input shaft 31, a housing 236, a ring gear 235, a sleeve 37, a plurality of bearings 39, a first clutch mechanism 250, and an output assembly 60. The input shaft 31, the sleeve 37, the bearings 39, and the output assembly 60 may be configured as described above. The housing 236 may be configured substantially the same as described above, except that it does not need to be configured for an actuator assembly and is configured to accept and provide a cavity 259 and a base 258 for the first clutch mechanism 250.

The first clutch mechanism 250 includes an engaging gear 251, a hub 255, a pressure plate 256, and a biasing member 257. The inner surface of the hub 255 of the clutch mechanism 250 is fixedly connected to the outside surface of the second end 33 of input shaft 31, so that the input shaft 31 and the hub 255 rotate about the rotational axis 34, having substantially the same torque and frequency. The engaging gear 251 may be selectively coupled to the hub 255, so that when the teeth of the inner surface of engaging gear 251 are engaged with teeth of the outer surface of hub 255, both the engaging gear 251 and the hub 255 rotate about the rotational axis 34 with the same torque and frequency. The engaging gear 251 may move relative to the hub 255 in a direction along the rotational axis 34, so that teeth mesh becomes uncoupled, as shown in FIGS. 8 and 9. Accordingly, the engaging gear 251 and the hub 255 rotate with different torques and frequencies.

The engaging gear 251 is driven into engagement with the hub 255 through an increase in fluid (pneumatic or hydraulic) pressure within the cavity 259 of the housing 236. According to an exemplary embodiment, the cavity 259 is pressurized, such that the pressure in the cavity 259 may be varied by a pump controlled by the ECU of the vehicle. To drive the engaging gear 251 into engagement with the hub 255, the fluid pressure in the cavity 259 is increased, which displaces the pressure plate 256 toward the base 258 of the housing 236, in turn displacing a biasing member 257 creating stored energy within the biasing member 257. The engaging gear 251 is coupled to the pressure plate 256, so that when the fluid pressure displaces the pressure plate 256, the engaging gear 251 is displaced substantially the same distance, bringing the teeth of the engaging gear 251 into engagement with the teeth of the hub 255. To disengage the engaging gear 251 from the hub 255, the fluid pressure in the cavity 259 is reduced to a pressure that is less than the stored energy of the biasing member 257, which allows the biasing member 257 to release its stored energy and displace the pressure plate 256 away from the base 258, driving the engaging gear 251 out of engagement with the hub 255. According to an exemplary embodiment, the biasing member 257 may be a coil or plate spring, or any other suitable spring type device for biasing the pressure plate 256 away from the base 258.

The first clutch mechanism 250 may further include a synchronizer 253, which couples the engaging gear 251 to the ring gear 235 through friction of the rings of the synchronizer 253 prior to engagement of the gear teeth of engaging gear 251 and ring gear 235. Thus, the synchronizer 253 permits the engaging gear 251 to rotate with substantially the same torque and frequency as the ring gear 235 prior to engagement of teeth to prohibit impact between the teeth upon engagement, which results when the teeth of two gears rotating with different frequencies and torques engage each other. The synchronizer 253 provides improved durability of the power transfer unit 230 by reducing wear and damage resulting from impact on the first clutch mechanism 250. According to an exemplary embodiment, the synchronizer 253 includes a double cone having friction material (typically a carbon based material) on both sides, to improve the efficiency of the synchronizer 253 allowing for a reduced diameter to manage the loading. According to other embodiments, the synchronizer 253 may include a single cone, triple cone, or other configuration to improve durability by reducing wear.

The power transfer unit 230 is shown in FIGS. 8 and 9 with the first clutch mechanism 250 disengaged (or deactivated), therefore torque is not being transferred from the input shaft 31 to the ring gear 235, so only the input shaft 31 rotates with torque from the front differential 19. In the disengaged configuration of the power transfer unit 230, the vehicle operates with torque being applied only to the first and second driveshafts 21, 23. When the first clutch mechanism 250 is engaged (or activated), torque is transferred from the input shaft 31 to the ring gear 235, so that both the input shaft 31 and the output assembly 60 of the power transfer unit 230 are driven by torque from the front differential 19. Under the engaged configuration of the first clutch mechanism 250 of the power transfer unit 230, the vehicle may operate with torque being applied to the first, second, third and fourth driveshafts 21, 23, 25, 27.

Figure 10:
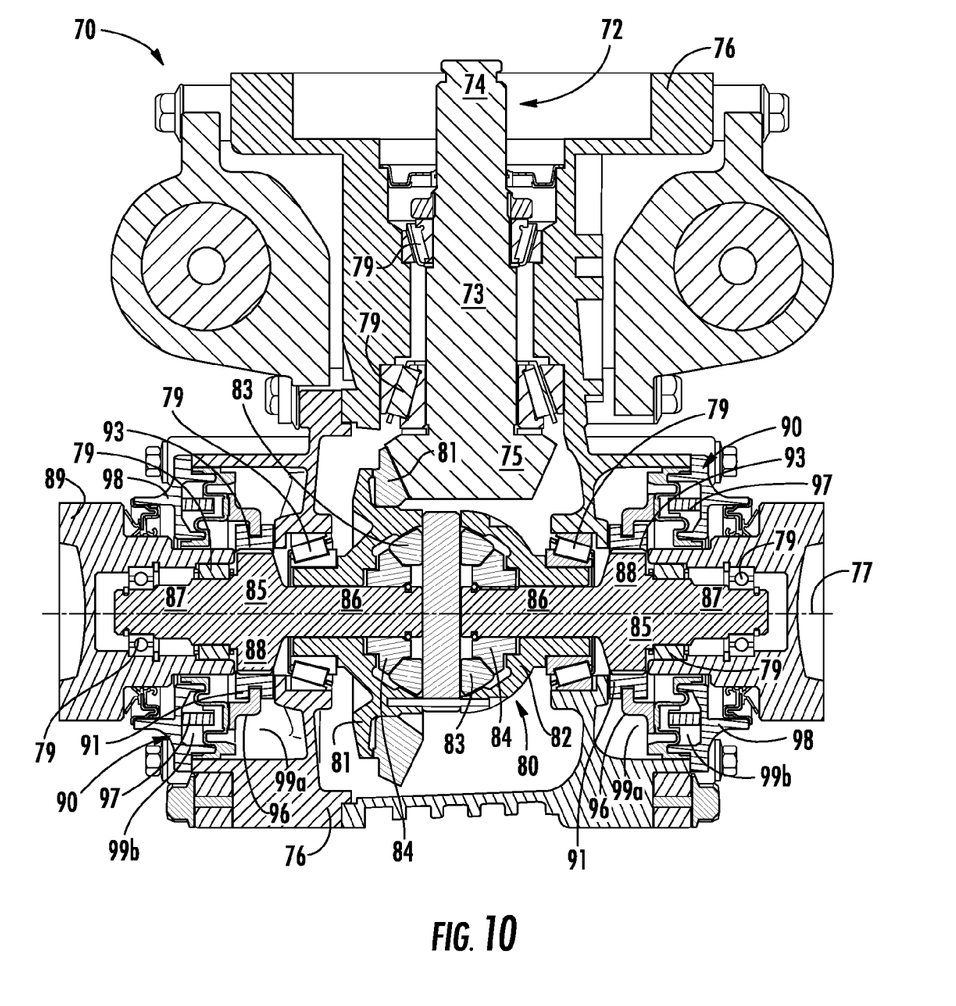
FIG. 10 is a partially sectioned top view of an exemplary embodiment of a rear drive unit shown in the disengaged position, for use within a drive train system, such as the drive train system of FIG. 1.

FIG. 10 illustrates a rear drive unit 70, according to an exemplary embodiment, that is configured for use within a power train system, such as the power train system 10 of FIG. 1. The rear drive unit 70 includes an input assembly 72, a casing (or housing) 76, at least one bearing 79, a differential assembly 80, at least one torque shaft 85, at least one driveshaft hub 89, and at least one second clutch mechanism 90. According to the exemplary embodiment shown, the rear drive unit 70 includes an input assembly 72, a casing 76, a plurality of bearings 79, a differential assembly 80, two torque shafts 85, two driveshaft hubs 89, and two second clutch mechanisms 90. The input assembly 72 may be contained within casing 76 and may include an input shaft 73 rotatably coupled to casing 76 using two bearings 79, so that input shaft 73 rotates relative to casing 76. The input shaft 73 includes a first end 74, which may be coupled to the cardan shaft 29, and a second end 75 having a beveled gear, which may be coupled to the differential assembly 80. Thus, torque transferred into the cardan shaft 29 drives the input shaft 73 of the rear drive unit 70, so that the input shaft 73 rotates in the same direction, and with the same torque and frequency as the cardan shaft 29.

According to an exemplary embodiment, the differential assembly 80 includes a ring gear 81, which includes beveled gear teeth that are rotatably coupled through a gear mesh with the beveled gear teeth of the second end 75 of input shaft 73. The differential assembly 80 further includes a carrier 82, which may be part of or fixedly coupled to the ring gear 81, so that rotation of ring gear 81 rotates carrier 82 with the same torque and frequency. The carrier 82 may provide bearing surfaces for torque shafts 85, which permit relative rotation between the carrier 82 and torque shafts 85 and provide substantial concentricity between the pivot axis of the carrier 82 and the pivot axis of the torque shafts 85. The combined ring gear 81 and carrier 82 may be contained within and rotatably coupled to housing 76 through bearings 79, which permit rotation of the combined ring gear 81 and carrier 82 relative to the casing 76. The differential assembly 80 further includes two pinion gears 83 and two side gears 84. Each pinion gear 83 has a pivot axis which is coupled to the carrier 82, so that when the carrier 82 rotates about the axis of rotation 77, as shown in FIG. 10, each pinion gear 83 and the pivot axis of each pinion gear 83 rotate in the same rotational direction with the same frequency as the carrier 82 about the axis of rotation 77. Additionally, each pinion gear 83 may rotate about its pivot axis relative to the carrier 82, and each pinion gear 83 includes beveled gear teeth, which mesh with the beveled gear teeth of the two side gears 84. Each side gear 84 is coupled to a torque shaft 85, so that rotation of the side gear 84 drives rotation of torque shaft 85 in the same rotational direction and with the same torque and frequency. The pivot axis of the side gears 84, the pivot axis of the torque shafts 85, and the pivot axis of the carrier 82 and ring gear 81 are substantially concentric, and are substantially the axis of rotation 77.

The differential assembly 80 transfers the torque and rotation from the input shaft 73 to the torque shafts 85, and does so under two different vehicle conditions. The first vehicle condition is when both the left and right wheels (of the same axle or same axis or rotation) rotate with substantially the same speed, such as when the vehicle drives in a substantially linear direction with substantially similar traction. Accordingly, the resistance to both wheels may be substantially similar. In the first vehicle condition, each pinion gear 83 of the differential assembly 80 does not rotate about its pivot axis (or relative to carrier 82), but does rotate about the axis of rotation 77 along with the carrier 82 and the ring gear 81. The side gears 84 that are rotatably coupled through a gear mesh to the pinion gears 83 rotate with substantially the same torque and frequency as the carrier 82 and ring gear 81 about the axis of rotation 77. Thus, in the first vehicle condition, both of the side gears 84 and hence both of the torque shafts rotate with substantially the same speed.

The second vehicle condition is when the left and right wheels (of the same axle or same axis of rotation) rotate with different speeds, such as when the vehicle drives in a non-linear direction (e.g., around a curve or turn). Accordingly, the resistance of the wheels is different. In the second vehicle condition, each pinion gear 83 of differential assembly 80 rotates about its pivot axis relative to carrier 82, and rotates about the axis of rotation 77. The two pinion gears 83 rotate about their respective pivot axes at substantially the same frequency. Rotation of the side gears 84 is driven through the beveled gear mesh by the rotation of the pinion gears 83. During the second vehicle condition, one side gear 84 rotates at a faster speed relative to the carrier 82, since the rotation of the pinion gears 83 about their pivot axes adds to (or increases) the rotational speed of this side gear 84 already driven by the rotation of the ring gear 81 and carrier 82. Simultaneously, the other side gear 84 rotates at a slower speed relative to the carrier 82, since the rotation of the pinion gears 83 about their axis subtracts from (or decreases) the rotational speed of this side gear 84 already driven by the rotation of the ring gear 81 and carrier 82. Thus, during the second vehicle condition, one side gear rotates at a faster speed relative to the other side gear, and in turn causes one wheel to rotate at a faster speed relative to the other wheel. For example, the wheel on the outside of the turn will rotate at faster speed than the wheel on the inside of the turn to accommodate the farther distance the outside wheel travels relative to the distance of the inside wheel.

According to an exemplary embodiment, the rear drive unit 70 includes two torque shafts 85. The torque shaft 85 includes a first end 86, which is coupled to one of the side gears 84 of the differential assembly 80, so that the torque shaft 85 rotates with the same torque and frequency as the side gear 84 it is coupled to. The first end 86 may also rotate within the bearing surface of carrier 82 to maintain concentricity to the axis of rotation 77. The torque shaft 85 further includes a second end 87 and gear teeth 88. The second end 87 may be pivotably coupled to driveshaft hub 89 using at least one bearing 79, so that the torque shaft 85 and the driveshaft hub 89 are substantially concentric to the axis of rotation 77. The gear teeth 88 of the torque shaft 85 is selectively coupled to the gear teeth of driveshaft hub 89 through the engaging gear 91 of the second clutch mechanism 90, so that when clutch mechanism 90 is engaged (or activated), the torque shaft 85 is coupled to driveshaft hub 89. Accordingly, both the torque shaft 85 and driveshaft hub 89 rotate in the same rotational direction with substantially the same torque and frequency. When the clutch mechanism 90 is not engaged (or deactivated), the torque shaft 85 is not coupled to the driveshaft hub 89. Accordingly, no torque is transferred from the torque shaft 85 to the driveshaft hub 89 permitting them to rotate independently. Thus, the torque shaft 85 and driveshaft hub 89 may rotate with different torques and different frequencies.

According to an exemplary embodiment, the second clutch mechanism 90 includes an engaging gear 91, a pressure plate 96, and a biasing member 97. The engaging gear 91 is slidably coupled to the torque shaft 85, so that both the engaging gear 91 and the torque shaft 85 rotate in the same direction about the axis of rotation 77 with substantially the same torque and frequency, yet the engaging gear 91 can slide in a direction along the axis of rotation 77 relative to torque shaft 85, when second clutch mechanism 90 is engaged and disengaged. Torque and rotation are transferred from the torque shaft 85 into the engaging gear 91 through a gear mesh between the gear teeth of the inner surface of engaging gear 91 and the external gear teeth 88 of torque shaft 85. This gear mesh coupling between the torque shaft 85 and the engaging gear 91 is maintained when the second clutch mechanism 90 is both engaged and disengaged.

The engaging gear 91 is driven or displaced into engagement with the driveshaft hub 89 by the displacement of the pressure plate 96. The engaging gear 91 is rotatably coupled to the pressure plate 96, so that the engaging gear 91 may rotate about the axis of rotation 77 relative to the pressure plate 96, yet displacement along the axis of rotation 77 of pressure plate 96 displaces the engaging gear 91 in the same direction with the same distance. The pressure plate 96 may be displaced or driven by an increase or decrease in fluid (pneumatic or hydraulic) pressure within the cavity 99*a* of the casing (or housing) 76. According to an exemplary embodiment, the cavity 99*a* is pressurized, such that the internal pressure in the cavity 99*a* may be varied by a pump controlled by the ECU of the vehicle. To drive the pressure plate 96 in the direction of the driveshaft hub 89 and hence drive the engaging gear 91 into engagement with the driveshaft hub 89, the fluid pressure in the cavity 99*a* is increased, which displaces the pressure plate 96 toward the base 98 of casing 76, which displaces a biasing member 97 creating stored energy within the biasing member 97. The engaging gear 91 is selectively coupled to the driveshaft hub 89 through a gear mesh, resulting from the displacement induced by the displacement of the pressure plate 96. The second clutch mechanism 90 is in the engaged position when fluid pressure has displaced the pressure plate 96 and the engaging gear 91 so that the gear teeth of the engaging gear 91 engage both the gear teeth 88 of the torque shaft 85 and the gear teeth of the driveshaft hub 89 simultaneously. Thus, the driveshaft hub 89, the engaging gear 91, and the torque shaft 85 all rotate about the axis of rotation 77 in the same rotational direction with substantially the same torque, power, and frequency when the second clutch mechanism 90 is engaged.

According to an exemplary embodiment, to disengage the engaging gear 91 from the driveshaft hub 89 (and in turn disengage second clutch mechanism 90), the fluid pressure in the cavity 99*a* is reduced to a pressure that is less than the stored energy of the biasing member 97, which allows the biasing member 97 to release its stored energy and displace the pressure plate 96 away from the base 98, driving the gear teeth of the engaging gear 91 out of engagement with the gear teeth of the driveshaft hub 89, decoupling the gear mesh. Thus, the driveshaft hub 89 may rotate independently from or relative to the engaging gear and torque shaft 85 about the axis of rotation 77, when the second clutch mechanism 90 is not engaged. According to an exemplary embodiment, the biasing member 97 may be a coil or plate spring, or any other suitable spring type device for biasing the pressure plate 96 away from the base 98.

According to another exemplary embodiment, the pressure plate 96 may be driven or displaced in a direction along the axis of rotation 77 by an increase or decrease in fluid (pneumatic or hydraulic) pressure within the second cavity 99*b* through the evacuation of fluid from or the introduction of fluid into the second cavity 99*b*. According to an exemplary embodiment, the cavity 99*b* is pressurized (or sealed within the housing 76), such that the internal pressure in the cavity 99*b* may be varied by a pump controlled by the ECU of the vehicle. The cavity 99*a* and second cavity 99*b* may work in an alternating manner to drive or displace the pressure plate 96 in a direction along the axis of rotation 77. For example, the cavity 99*a* may be actuated, as disclosed above, to displace the pressure plate 96 and engaging gear 91 toward the driveshaft hub 89, so that the gear teeth of the engaging gear 91 are detachably engaged with the gear teeth of the driveshaft hub 89, causing torque and power to be transmitted from the torque shaft 85 to the driveshaft hub 89. Then, the cavity 99*b* may be actuated substantially simultaneously to or subsequent to deactuation of the cavity 99*a*, to drive the pressure plate 96 and engaging gear 91 away from the driveshaft hub 89, so that the gear teeth of the engaging gear 91 are uncoupled with the gear teeth of the driveshaft hub 89, whereby no torque or power are transmitted to driveshaft hub 89 from torque shaft 85.

According to another exemplary embodiment, the pressure plate 96 may be driven or displaced in a direction along the axis of rotation 77 by an electro-mechanical device to engage and disengage the gear teeth of the engaging gear 91 with the gear teeth of the driveshaft hub 89. The electro-mechanical device may include at least one from the group consisting of a ball ramp, a linear actuator (e.g., solenoid), a worm-gear, and shift fork. Those skilled in the art will recognize that the rear drive units disclosed herein are not limited to the inclusion of the aforementioned electro-mechanical devices and others may be used to drive or displace the pressure plate and engaging gear. According to yet another exemplary embodiment, pressure plate may be driven or displaced in a direction along the axis of rotation 77 by an electro-magnetic device.

The second clutch mechanism 90 may further include a synchronizer 93, which couples the engaging gear 91 to the driveshaft hub 89 through friction of the rings of the synchronizer 93, so that the engaging gear 91 and the driveshaft hub 89 rotate with substantially the same torque and frequency prior to engagement of the gear teeth of the engaging gear 91 to the gear teeth of the driveshaft hub 89. Thus, the synchronizer 93 prevents or minimizes the negative engaging effects (e.g., impact damage, noise, etc.) caused when two gears rotating with different frequencies and torques suddenly engage each other through a gear mesh. The synchronizer 93 provides improved durability of the rear drive unit 70 by reducing wear and damage on the second clutch mechanism 90. According to an exemplary embodiment, the synchronizer 93 includes a double cone having friction material (typically a carbon based material) on both sides, to improve the efficiency of the synchronizer 93 allowing for a reduced diameter to manage the loading. According to other embodiments, the synchronizer 93 may include a single cone, triple cone, which may be tailored to the application and configured to improve durability by reducing wear.

According to an exemplary embodiment, the drive train system 10 may be configured so that during vehicle operation the first clutch mechanism 50 of the power transfer unit 30 may be engaged first, so that the cardan shaft 29 and the coupled rear drive unit 70 are brought up to speed. Then when the speed of the torque shaft 85 is similar to the speed of the driveshaft hub 89, the second clutch mechanisms 90 may be activated or engaged to couple the torque shafts 85 to the driveshaft hubs 89, thus transferring torque to the torque shafts 85 and to third and forth driveshafts 25, 27. This configuration would ensure a relative smooth coupling between the gear teeth of driveshaft hub 89 and the gear teeth of engaging gear 91, to minimize the negative engaging effects (e.g., impact damage, noise, etc.) to the gear mesh when coupled. According to another exemplary embodiment, the drive train system 10 may be configured so that during vehicle operation the second clutch mechanisms 90 of the rear drive unit 70 may be engaged first, so that the driveshaft hubs 89, rear drive unit 70, and cardan shaft 29 are brought up to speed. Then subsequently, the first clutch mechanism 50 may be activated or engaged to couple torque between the input shaft 31 and the cardan shaft 29, wherein the first clutch mechanism 50 may include synchronizer 53 to minimize the negative engaging effects to the gear mesh when coupled. Those skilled in the art will recognize that the use of a synchronizer disclosed herein may be used to change the engagement strategy of the drive train system in a manner having minimal negative engaging effects.

When torque is being transferred from the cardan shaft 29 into the input assembly 72 of the rear drive unit 70, torque may then be transferred through the rear drive unit 70 and into the driveshaft hubs 89 by engaging the second clutch mechanisms 90. One driveshaft hub 89 may be coupled to the third (or rear right) driveshaft 25, and the other driveshaft hub 89 may be coupled to the fourth (or rear left) driveshaft 27. Accordingly, torque is supplied to both the third (or rear right) and fourth (or rear left) wheels 26, 28. This mode of operation of the drive train 10 of the vehicle involves having all wheel drive, or where all four wheels may be supplied torque.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the drive train systems as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A drive train system, comprising:
 a power transfer unit configured to selectively transfer power from a front driveshaft of a vehicle by providing an output torque through a ring gear, wherein the power transfer unit includes an input shaft, a sleeve, and a first clutch, the sleeve concentric with the input shaft, the ring gear fixedly coupled to the sleeve, the first clutch including an engaging gear coupled to the input shaft, wherein the input shaft receives torque from a first device and the first clutch is configured to selectively couple the input shaft to the ring gear when activated via direct gear-to-gear engagement between the ring gear and the engaging gear of the first clutch;
 a cardan shaft configured to be driven by the ring gear and configured to transfer the output torque; and
 a rear drive unit coupled to the cardan shaft and configured to selectively transfer the output torque received from the cardan shaft to a rear driveshaft of the vehicle, wherein the rear drive unit includes a torque shaft that is driven by the output torque received from the cardan shaft, and a second clutch that is configured to selectively transfer the output torque from the torque shaft to the rear driveshaft when activated.

2. The drive train system of claim 1, wherein the engaging gear is configured to slide between a first position in which the input shaft is coupled to the ring gear and a second position in which the input shaft is decoupled from the ring gear.

3. The drive train system of claim 2, wherein the power transfer unit further includes an actuator for activating the first clutch.

4. The drive train system of claim 3, wherein the actuator is configured to move the engaging gear between the first and second positions.

5. The drive train system of claim 4, further comprising a shift fork provided between the actuator and the engaging gear, wherein the actuator is configured to move the shift fork to move the engaging gear.

6. The drive train system of claim 4, wherein the actuator is an electric motor.

7. The drive train system of claim 4, wherein the actuator is a piston that is controlled by fluid pressure.

8. The drive train system of claim 1, wherein the power transfer unit further includes an output shaft configured to transfer the output torque from the ring gear to the cardan shaft.

9. The drive train system of claim 1, wherein the rear drive unit further includes a second torque shaft, wherein the first torque shaft selectively transfers the output torque to a first rear driveshaft and the second torque shaft selectively transfers the output torque to a second rear driveshaft.

10. The drive train system of claim 9, wherein the rear drive unit further includes a third clutch that is configured to selectively transfer the output torque from the second torque shaft to the second rear driveshaft when activated.

11. The drive train system of claim 9, wherein the rear drive unit further includes a differential assembly configured to receive the torque from the cardan shaft, and configured to rotate the first and second torque shafts at similar or different speeds, depending on the vehicle condition.

12. The drive train system of claim 11, wherein the rear drive unit further includes an input shaft configured to transfer torque received from the cardan shaft to the differential assembly.

13. The drive train system of claim 1, wherein the second clutch includes an engaging gear configured to slide between a first position in which the torque shaft is coupled to the rear driveshaft and a second position in which the torque shaft is decoupled from the rear driveshaft.

14. The drive train system of claim 1, wherein the first device is a differential assembly configured to receive torque from a transmission of the vehicle.

15. A power transfer unit for selectively transferring torque and configured for use in a drive train system of a motor vehicle, the power transfer unit comprising:
- an input shaft that is configured to rotate about a rotational axis and receives an input torque from a first drive train device;
- a clutch having a hub connected to the input shaft and an engaging gear slideably coupled to the hub, wherein the hub rotates about the rotational axis with the input shaft;
- a sleeve concentric with the input shaft; and
- a ring gear fixedly coupled to the sleeve and configured to selectively rotate about the rotational axis to provide an output torque;
- wherein when the clutch is activated, the engaging gear slides into direct gear-to-gear engagement with the ring gear to transfer the input torque from the input shaft to the ring gear through the clutch; and
- wherein when the clutch is deactivated, the engaging gear slides out of direct gear-to-gear engagement with the ring gear, such that no torque is transferred to the ring gear through the clutch.

16. The power transfer unit of claim 15, wherein the engaging gear slides in a direction substantially parallel to the rotational axis to engage and disengage the ring gear.

17. The power transfer unit of claim 15, further comprising an actuator configured to activate and deactivate the clutch by moving the engaging gear into and out of engagement with the ring gear.

18. The power transfer unit of claim 17, wherein the actuator is an electric motor.

19. The power transfer unit of claim 17, wherein the actuator is a piston that is controlled by fluid pressure.

20. The power transfer unit of claim 17, further comprising a shift fork having a first end connected to the engaging gear and a second end connected to the actuator, wherein the actuator is configured to move the shift fork to move the engaging gear.

21. The power transfer unit of claim 15, further comprising an output shaft configured substantially transverse to the rotational axis and configured to provide an output torque, wherein the output shaft is configured to receive the torque from the ring gear.

22. The power transfer unit of claim 15, wherein the first drive train device is a differential assembly configured to receive torque from a transmission.

23. A rear drive unit for use in a drive train system of a motor vehicle and configured to selectively transfer a received input torque to first and second rear wheels of the vehicle, the rear drive unit comprising:
- a first torque shaft configured to receive the input torque and configured to rotate about an axis of rotation;
- a first driveshaft hub for coupling to a first rear driveshaft carrying the first rear wheel;
- a second torque shaft configured to receive the input torque and configured to rotate about the axis of rotation;
- a second driveshaft hub for coupling to a second rear driveshaft carrying the second rear wheel;
- a first clutch including a first engaging gear rotationally slideably coupled to the first torque shaft, the first clutch configured to selectively transfer the input torque from the first torque shaft to the first driveshaft hub and to the first rear driveshaft and first rear wheel of the vehicle when activated; and
- a second clutch including a second engaging gear rotationally slideably coupled to the second torque shaft, the second clutch configured to selectively transfer the input torque from the second torque shaft to the second driveshaft hub and to the second rear driveshaft and second rear wheel of the vehicle when activated;
- wherein when the first clutch is deactivated no torque is transferred from the first torque shaft to the first rear wheel, when the first clutch is activated the first engaging gear engages the first driveshaft hub via direct gear-to-gear engagement; and
- wherein when the second clutch is deactivated no torque is transferred from the second torque shaft to the second rear wheel, when the second clutch is activated the second engaging gear engages the second driveshaft hub via direct gear-to-gear engagement.

24. The rear drive unit of claim 23, further comprising a differential assembly configured to receive the input torque and output a first torque to the first torque shaft and a second torque to the second torque shaft; wherein the differential assembly is configured to rotate the first and second torque shafts at similar or different speeds depending on the vehicle condition.

25. The rear drive unit of claim 24, further comprising an input shaft configured substantially transverse to the axis of rotation of the first and second torque shafts, and configured to receive the input torque; wherein the input shaft includes a gear for transferring the input torque to the differential assembly.

26. The rear drive unit of claim 23, wherein the first engaging gear is configured to slide between a first position in which the first torque shaft is coupled to the first rear wheel of the vehicle and a second position in which the first torque shaft is decoupled from the first rear wheel of the vehicle; and wherein the second engaging gear is configured to slide between a first position in which the second torque shaft is coupled to the second rear wheel of the vehicle and a second position in which the second torque shaft is decoupled from the second rear wheel of the vehicle.

27. The rear drive unit of claim 23, wherein the rear drive unit receives the input torque from a cardan shaft of the vehicle.

* * * * *